Nov. 23, 1965  N. W. BELL  3,219,942
ELECTRICAL CIRCUIT USING THERMAL ELEMENTS
Filed Nov. 18, 1960  2 Sheets-Sheet 1
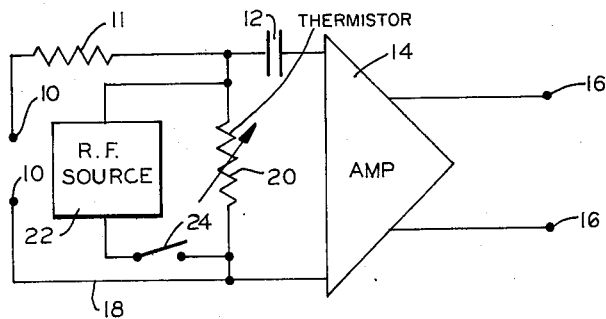
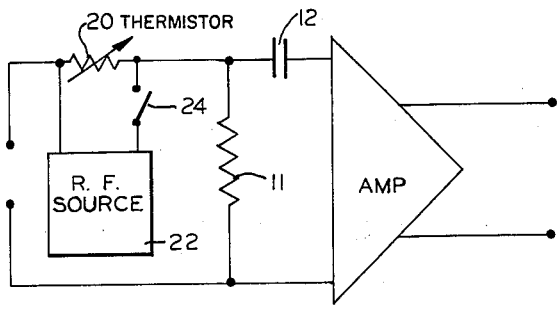
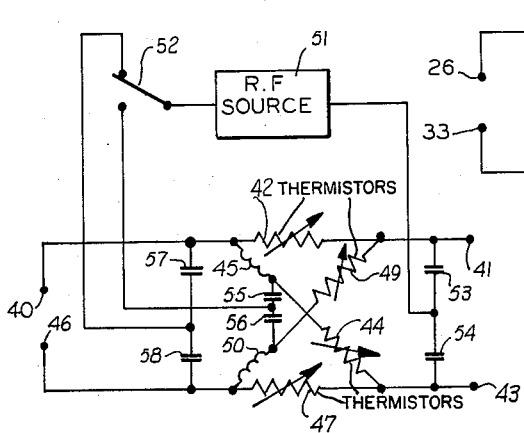
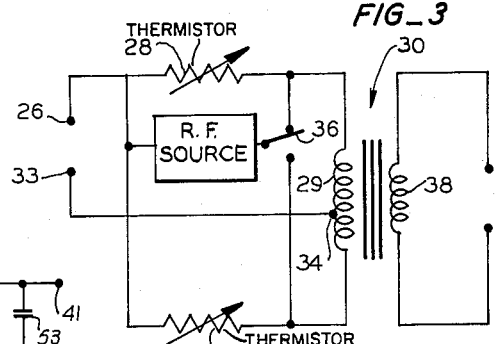
INVENTOR.
NORTON W. BELL
BY Christie, Parker & Hale
ATTORNEYS

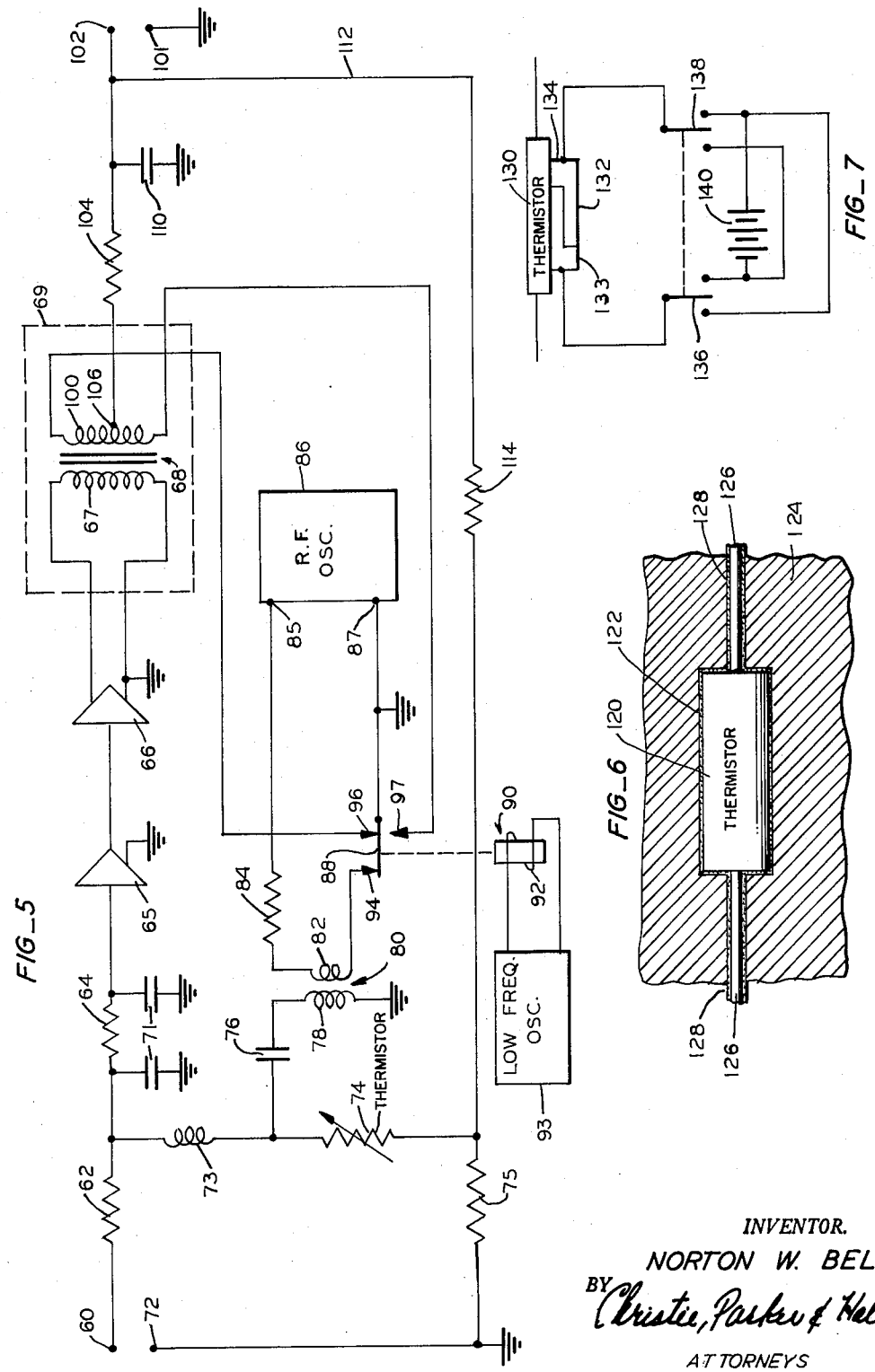

United States Patent Office 3,219,942
Patented Nov. 23, 1965

3,219,942
ELECTRICAL CIRCUIT USING THERMAL ELEMENTS
Norton W. Bell, Monrovia, Calif., assignor to Consolidated Electrodynamics Corporation, Pasadena, Calif., a corporation of California
Filed Nov. 18, 1960, Ser. No. 70,332
14 Claims. (Cl. 330—10)

This invention relates to the modulation or frequency changing of low-frequency or direct current signals.

A common problem in industrial and laboratory measurements is that of converting small direct current voltages, or D.C. voltages which vary at relatively low frequency, to proportionate alternating current voltages which can be amplified by conventional means.

Mechanical "choppers" are often used to interrupt intermittently the low-frequency or D.C. signal to develop an A.C. signal which can be amplified and thereafter demodulated to produce a D.C. output signal proportional to the input signal. The mechanical "choppers" suffer the disadvantages that they require a relatively large space for their installation, and are subject to relatively short life due to the repeated making and breaking of electrical contacts.

These characteristics are particularly troublesome when it is necessary to modulate a low-frequency or D.C. signal at some remote or inaccessible location, such as the low-level signal from a thermocouple located in an atomic reactor. A conventional mechanical "chopper" in such an installation has a relatively limited life, and if mounted near the signal source, presents a replacement problem due to radiation hazards. The modulator of this invention can be located in such an inaccessible location in a very small space, and it has an infinite life.

Briefly, this invention provides a circuit which uses a thermistor which is rapidly heated and cooled to modulate a low-frequency or D.C. signal. Thermistors are well-known semiconducting oxides that have high negative temperature coefficients of resistance, i.e., the resistance of a thermistor decreases rapidly with temperature increase instead of increasing in resistance as is the case with conventional conductors.

Preferably, the thermistor is imbedded in a suitable heat sink, such as silver or mercury, and is heated by internal dissipation due to radio frequency current passed through it from an external source intermittently to cause the thermistor to be heated and cooled rapidly and repeatedly.

These and other aspects of the invention will be more fully understood from the following detailed description taken in conjunction with the accompanying drawings in which:

FIG. 1 is a schematic circuit diagram of a simple shunt circuit using a thermistor in accordance with this invention;

FIG. 2 is a schematic circuit diagram showing the use of the thermistor in a simple series circuit;

FIG. 3 is a schematic circuit diagram showing the use of a pair of thermistors and a center tap circuit;

FIG. 4 is a schematic circuit diagram showing the use of four thermistors in a lattice network;

FIG. 5 is a schematic circuit diagram showing means for demodulating the signal developed by the thermistor;

FIG. 6 is a schematic drawing of a thermistor mounted in a heat sink in accordance with the invention, and FIG. 7 is a schematic drawing of an alternate embodiment for heating and cooling a thermistor.

Referring to FIG. 1, the circuit includes input terminals 10, which are adapted to be connected to a source of low-frequency or D.C. signals such as those that might be developed by a thermocouple subjected to relatively slowly varying temperature. One of the input terminals is connected in series through a resistor 11 and a capacitor 12 to the input of a conventional amplifier 14, which has a pair of A.C. output terminals 16. The other D.C. input terminal is connected by a lead 18 to the other input of the amplifier. A thermistor 20 is connected to lead 18 and a point between resistor 11 and capacitor 12 to serve as a shunt for the D.C. input. A radio frequency source 22, which may be of conventional type, is connected across the thermistor 20 through a switch 24, which is opened and closed to cause the thermistor to be heated and cooled. As the thermistor is heated, its resistance drops and the D.C. signal applied to the amplifier decreases. When the switch 24 is open, interrupting the RF source, the thermistor cools so that its resistance increases and the D.C. signal to the amplifier is also increased. The switch is opened and closed at a low frequency, say 10–25 c.p.s., and the amplifier is designed to be insensitive to the RF source.

In the circuit of FIG. 2, the position of the thermistor 20 and the resistor 11 in the circuit of FIG. 1 are reversed so that the thermistor is connected in series with the D.C. source. As with the circuit in FIG. 1, the RF source 22 is intermittently applied to the thermistor 20 so that its resistance increases and decreases periodically, thereby applying a proportional AC voltage to the amplifier.

In FIG. 3, one terminal 26 of a signal input is connected through a first thermistor 28 to one end of a primary winding 29 of a transformer 30. The other end of the primary ending winding 29 is connected through a second thermistor 32 to the input 26. A second input 33 is connected to a center tap 34 on the primary winding 29. An RF source is connected to the input ends of thermistors 28 and 32, and is adapted to be connected by double pole switch 36 alternately to the output ends of thermistors 28 and 32 so that as the switch is moved back and forth the thermistors are successively and alternately heated and cooled. With the switch in the position shown in FIG. 3, RF energy is applied to thermistor 28 so that it heats, and no energy is applied to thermistor 32 so that it cools. The opposite condition prevails when the position of the switch 36 is reversed so that an A.C. signal is developed at the primary winding 29 proportional to the D.C. input. The developed A.C. signal is picked up by a secondary winding 38 of the transformer 30. The inductance of the winding 29 is sufficiently high to the RF source to avoid interference with the A.C. output. If desired suitable conventional filters may be used to keep the RF signal from the winding 29.

In FIG. 4, a first D.C. input terminal 40 is connected to a first A.C. output terminal 41 through a first thermistor 42, and is connected to a second A.C. output terminal 43 through a second thermistor 44 and an inductance 45. A second D.C. terminal 46 is connected through a third thermistor 47 to the second A.C. terminal 43, and through a fourth thermistor 49 and an inductance 50 to the first A.C. terminal 41. An RF source 51 is arranged to be connected through a switch 52 alternately and successively across the first and third thermistors 42 and 47 and then across the second and fourth thermistors 44 and 49. The connections are made through blocking condensers 53, 54, 55, 56, 57 and 58 which pass the RF signal from the source 51 but block the D.C. input signal. The inductances 45 and 50 block the RF signal but pass the D.C. input signal. Thus, as the switch 52 is moved back and forth between its respective contacts, the first and third thermistors are heated as the second and fourth thermistors are cooled, and vice versa, developing an A.C. output at terminals 41 and 43 proportional to the direct current or low-frequency signal at the input terminals 40 and 46.

In the circuit of FIG. 5, a D.C. signal input terminal 60 is connected in series with a resistor 62, a resistor 64, and the input of a first amplifier 65, the output of which is coupled to the input of a second amplifier 66, the output of which is connected to the primary winding 67 of a first transformer 68 in a demodulator stage 69. Capacitors 71 are connected to opposite ends of resistor 64 and to ground.

A second D.C. input terminal 72 is connected to ground.

The D.C. input signal is shunted to ground through an inductance 73, a thermistor 74, and a resistor 75.

Radio frequency energy is applied to the thermistor 74 through a capacitor 76 and a secondary winding 78 of a second transformer 80, which has a primary coil 82 connected at one end through a resistor 84 to a first terminal 85 of a radio frequency oscillator 86. A second terminal 87 of the RF oscillator is grounded and also connected to an armature 88 of a relay 90 which is energized by a coil 92 connected to a low-frequency oscillator 83. As the armature 88 is reciprocated by the relay 90, the second terminal 87 of the radio frequency oscillator is first connected to contacts 94 and 96 and then moved against contacts 97. Contact 94 is connected to the end of the winding 82 opposite from that to which resistor 84 is connected. Contacts 96 and 97 are respectively connected to opposite ends of a secondary winding 100 in the first transformer 68 of the demodulator stage.

A first signal output terminal 101 is grounded and a second output terminal 102 is connected through a resistor 104 to a center tap position 106 on the secondary winding of the first transformer. The signal output 102 is also coupled to ground through a capacitor 110. Negative feedback is supplied from the output terminal 102 through a line 112 and a resistor 114, which is connected to a point in the circuit between thermistor 74 and 75.

In the operation of the circuit shown in FIG. 5, the input is applied to terminals 60 and 72 and radio frequency energy is applied to the thermistor 74 from the first oscillator 86. The inductance 73 and the capacitors 71 prevent the high frequency voltage from overloading the A.C. amplifiers 65 and 66. The radio frequency energy to the thermistor is pulsed by the operation of the second oscillator 94, which cycles the relay 90 at a relatively low frequency, say between 10 and 80 cycles per second. The radio frequency oscillator can be driven at any desired frequency, say 250 kc.

Thus, as the thermistor is heated and cooled the signal applied to the amplifier is accordingly modulated, and the output of the second amplifier is demodulated so that an amplified D.C. output appeared across the output terminals 101 and 102 is proportional to the input signal.

Negative feedback is provided through resistors 75 and 114. The resistance of resistor 75 is much smaller than that of either the thermistor or resistor 114. The series feedback increases the input impedance in the circuit and compensates for changes in conversion efficiency of the thermistor "chopper" or changes in gain of the A.C. amplifier. Ordinarily, about 30 db feedback is satisfactory.

FIG. 6 shows schematically one arrangement of a thermistor used in accordance with this invention. The thermistor element 120 is coated with a thin film of clear insulating lacquer 122 or the like, and is immsersed in a heat sink 124, which may be liquid mercury, or an amalgam of mercury and silver to obtain better heat transfer. When an amalgam of silver and mercury is used, it is preferable to incorporate a small amount of zinc to control the thermal coefficient of expansion to match that of the thermistor material.

Electrical connections are made to the thermistor with any suitable conductors 126, which are each surrounded by respective insulator sleeves 128. The thermistor can be of any suitable type which preferably has good voltage-current linearity. I have found that the glass-coated bead thermistor type 43A1, sold by the Victory Engineering Company makes a satisfactory direct current or low-frequency modulator element when it is coated with thinned clear Glyptal and dried with an infra-red lamp. Such a thermistor is about 14 mils in diameter, has 1 mil platinum-iridium leads, and was readily heated by a current of about 6 milliamps radio frequency current to decrease its resistance to about one-tenth of its room temperature resistance of about 30 K ohms. When the heating current was interrupted the resistance increased by a factor of two in only ten milliseconds, and increased by a factor of greater than three in twenty milliseconds.

Of course, the thermistor can be of any desired size and can be heated by other means, such as indirect heating, to simplify the circuits required. Moreover, more rapid cooling can be provided by circulating a cooling fluid such as mercury past the thermistor.

FIG. 7 shows an arrangement in which a thermistor 130 is heated indirectly with a conventional thermojunction 132, which is bonded in good heat transfer relationship with the thermistor, but insulated electrically from it by a thin film of insulating lacquer (not shown). The thermojunction may be of conventional type and made of two sections 133, 134 of different conductors. Section 133 is connected to a first switch 136, which is ganged to a second switch 138, which in turn is connected to the other section 134. The switches 136 and 138 are disposed as shown so they can be moved in contact with either the positive or negative terminals of D.C. source 140. When the switches are moved into contact with one set of terminals, current flows through the thermojunction in a direction to cause it to be heated. When the switches are thrown in the opposite direction, the flow of current is reversed and the thermojunction is cooled. Thus, the thermistor is also heated and cooled to modulate a low frequency or D.C. signal as described above.

I claim:

1. A circuit for modulating an electric signal, the circuit having a signal input and a signal output, a semiconductor oxide thermistor connected in the circuit so at least a portion of a signal applied to the input passes through the thermistor, and means for increasing and decreasing the temperature of the thermistor independently of the signal and at a rate greater than the frequency of the signal to vary the amount of signal passing through the thermistor and appearing at the signal output of the circuit.

2. A circuit for modulating an electric signal, the circuit having a signal input and a signal output, a semiconductor oxide thermistor connected in the circuit so at least a portion of a signal applied to the input passes through the thermistor, and means for intermittently applying alternating current to the thermistor independently of the signal and at a rate greater than the frequency of the signal to increase and decrease the temperature of the thermistor and thereby vary the amount of signal passing through the thermistor and appearing at the signal output of the circuit.

3. A circuit for modulating an electric signal, the circuit having a signal input and a signal output, a semiconductor oxide thermistor connected in the circuit so at least a portion of a signal applied to the input passes through the thermistor, and means for intermittently applying radio frequency current to the thermistor independently of the signal and at a rate greater than the frequency of the signal to increase and decrease the temperature of the thermistor and thereby vary the amount of signal passing through the thermistor and appearing at the signal output of the circuit.

4. A circuit for modulating an electric signal, the circuit having a signal input and signal output, a thermistor connected in the circuit so at least a portion of a signal applied to the input passes through the thermistor, a heat sink disposed around and in contact with the thermistor, and means for increasing and decreasing the temperature of the thermistor independently of the signal and at a rate greater than the frequency of the signal to vary the amount of signal passing through the thermistor and appearing at the signal output of the circuit.

5. Apparatus according to claim 4 in which the heat sink is mercury.

6. Apparatus according to claim 4 in which the heat sink is silver.

7. Apparatus according to claim 4 in which the heat sink is an amalgam of silver and mercury.

8. A circuit for modulating an electric signal, the circuit having a signal input and a signal output, a semiconductor oxide thermistor connected in the circuit in series with the signal, and means for increasing and decreasing the temperature of the thermistor independently of the signal and at a rate greater than the rate of frequency of the signal to vary the amount of signal passing through the thermistor and appearing at the signal output of the circuit.

9. A circuit for modulating an electric signal, the circuit having a signal input and a signal output, a semiconductor oxide thermistor connected in the circuit to shunt a portion of a signal applied to the input through the thermistor, and means for increasing and decreasing the temperature of the thermistor independently of the signal and at a rate greater than the rate of frequency of the signal to vary the amount of signal passing through the thermistor and appearing at the signal output of the circuit.

10. A circuit for modulating an electric signal, the circuit having a signal input and a signal output, a semiconductor oxide thermistor connected in the circuit so at least a portion of a signal applied to the input passes through the thermistor, means for increasing and decreasing the temperature of the thermistor independently of the signal and at a rate greater than the rate of frequency of the signal to modulate the amount of signal passing through the thermistor, means for amplifying the modulated signal, and means for demodulating the amplified signal.

11. A circuit for modulating an electric signal, the circuit having a signal input and a signal output, a semiconductor oxide thermistor connected in the circuit so at least a portion of a signal applied to the input passes through the thermistor, a first oscillator, a second oscillator, and means responsive to the output of the first oscillator for intermittently connecting the first oscillator across the thermistor to heat and cool it to vary the amount of signal passing through the thermistor and appearing at the signal output of the circuit.

12. Apparatus according to claim 11 in which the second oscillator is of a lower frequency than the first.

13. A circuit for modulating an electric signal, the circuit having a signal input and a signal output, a semiconductor oxide thermistor connected in the circuit so at least a portion of a signal applied to the input passes through the thermistor, means for increasing and decreasing the temperature of the thermistor independently of the signal and at a rate greater than the rate of frequency of the signal to vary the amount of signal passing through the thermistor and appearing at the signal output of the circuit, and means for coupling negative feedback from the output to the thermistor.

14. A circuit for modulating an electric signal, the circuit having a signal input and a signal output, a semiconductor oxide thermistor connected in the circuit so at least a portion of a signal applied to the input passes through the thermistor, a thermocouple junction in contact with the thermistor to provide good heat transfer therebetween, and means for passing current through the junction in first one direction and then the other to heat and cool the thermistor.

References Cited by the Examiner

UNITED STATES PATENTS

| | | | |
|---|---|---|---|
| 2,459,104 | 1/1949 | Gilbert | 332—4 |
| 2,810,885 | 10/1957 | Davis et al. | 332—4 |

FOREIGN PATENTS

| | | |
|---|---|---|
| 751,533 | 6/1956 | Great Britain. |

ROY LAKE, *Primary Examiner.*

L. MILLER ANDRUS, ARTHUR GAUSS, *Examiners.*